United States Patent [19]

Takenaka et al.

[11] Patent Number: 5,896,352
[45] Date of Patent: Apr. 20, 1999

[54] DISC PLAYER FOR PLAYING MULTIPLE DISCS CONSECUTIVELY

[75] Inventors: Yoshihiko Takenaka; Tatsuro Nagao, both of Saitama-ken, Japan

[73] Assignee: Pioneer Electronic Corporation, Tokyo, Japan

[21] Appl. No.: 08/816,910

[22] Filed: Mar. 13, 1997

[30] Foreign Application Priority Data

Mar. 13, 1996 [JP] Japan ..................... 8-084579

[51] Int. Cl.[6] ........................... G11B 17/22
[52] U.S. Cl. ........................... 369/32; 369/58
[58] Field of Search .................. 369/32, 47, 58, 369/54, 34, 36, 44.29, 44.25, 44.27, 44.41, 116, 110, 30

[56] References Cited

U.S. PATENT DOCUMENTS

| | | | |
|---|---|---|---|
| 5,003,521 | 3/1991 | Yoshida et al. | 369/44.25 |
| 5,042,020 | 8/1991 | Endo | 369/44.31 |
| 5,237,549 | 8/1993 | Shimozawa | 369/44.17 |
| 5,289,451 | 2/1994 | Ashinuma et al. | 369/58 |
| 5,684,771 | 11/1997 | Furukawa et al. | 369/58 |

FOREIGN PATENT DOCUMENTS

0580361   1/1994   European Pat. Off. .

*Primary Examiner*—Ali Neyzari
*Attorney, Agent, or Firm*—Morgan, Lewis & Bockius LLP

[57] ABSTRACT

A mini disc (MD) player has the capability of displaying data without problems during playback. When plural mini discs should be played back consecutively, TOC (table of contents) data are read from all of these discs. Then, the discs are played back in succession. When compressed audio data derived from these discs are stored in a DRAM, a disc identification flag is added to every disc.

6 Claims, 9 Drawing Sheets

DISC PLAYER FOR PLAYING MULTIPLE DISCS CONSECUTIVELY

This application claims the benefit of Application No. 8-84579 filed in Japan on Mar. 13, 1996, which is hereby incorporated by reference.

BACKGROUND OF THE INVENTION

1. Field of the Invention

The present invention relates to a device for judging which one of a plurality of mini discs is the currently played disc (i.e., the disc from which data read from a memory is derived) when these discs are played back normally or in succession.

2. Description of the Related Art

In recent years, mini discs (64 mm in diameter) which are smaller than the compact disc (CD) but permit writing and reading of substantially the same amount of data as the CD by the use of an information compression technology known as adaptive transform acoustic coding (ATRAC) have began to come into wide use. The MD (mini disc) uses a shock-proof DRAM (dynamic random access memory) to prevent skipping of the reproduced sound due to vibration.

For example, compressed audio data recorded onto the disc is read at a data transfer rate of 1.4 Mbits/s by an optical pickup and written into the DRAM. The data is then read from the DRAM a data transfer rate of 0.3 Mbits/s and decoded by a decoder, expanded, and sent out. In this case, it is assumed that the DRAM has a capacity of 1 Mbits. The compressed audio data is read in in about 0.9 second and decoded in about 3 seconds while being read from the DRAM. If a large vibration is applied from outside at this time, and if the digital information on the disc cannot be read, reading of the compressed audio data from the DRAM is enabled for about 3 seconds. Therefore, if the optical pickup can go back to its original position on the disc within 3 seconds and restart the reading of the compressed audio data, then sound skipping can be prevented. For example, if the DRAM has a capacity of 4 Mbits, it follows that information corresponding to about 12 seconds is stored in the DRAM.

Because of the use of the DRAM described above, a slight time gap is present between the instant when data is read from the disc and the instant when the data actually arrives as sound to the user.

Figure 7:
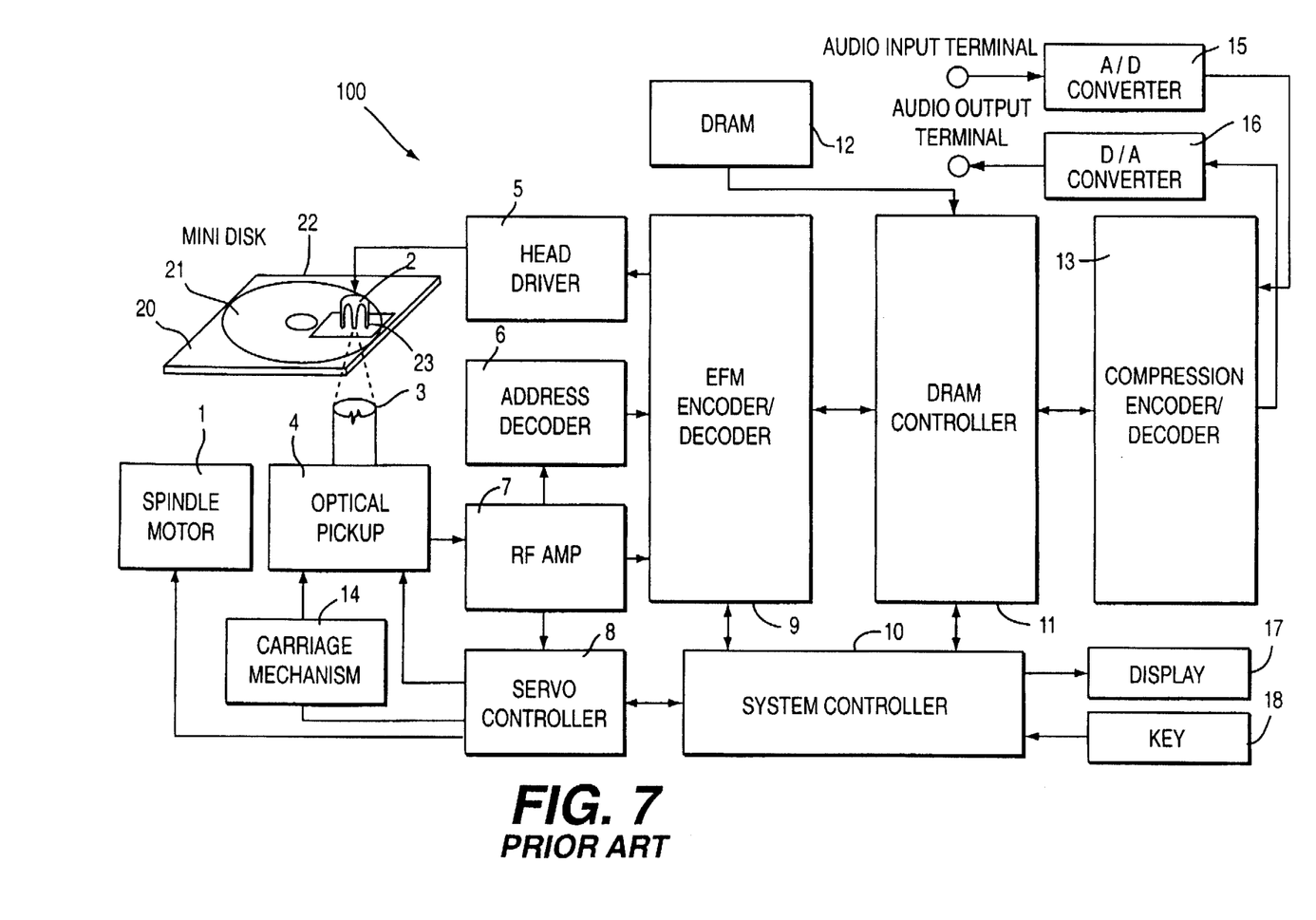
FIG. 7 is a block diagram of the prior art MD player.

FIG. 7 is a detail block diagram of a mini disc (MD) player. Compressed audio data is recorded on an MD 20, which has a magnetooptical disc 21 rotatably held in cartridge 22. This cartridge 22 has a shutter 23. When MD 20 is placed in the record/playback position inside an MD player 100, a shutter-driving mechanism (not shown) opens the shutter 23 to permit a light beam from an optical pickup 4 to impinge on the recording surface of the magnetooptical disc 21. This also enables application of a magnetic field modulated by a recording signal fed from the magnetic head during playback. During reading, when the magnetooptical disc 21 is being rotated at a given rotational speed by a spindle motor 1, if the beam sharply focused by an objective lens 3 hits the recording surface of the magnetooptical disc 21, a reflected beam occurs which has a plane of polarization rotating according to the direction of magnetization of the recording signal. This reflected beam is read as an RF signal by the optical pickup 4 and sent to an RF amplifier 7, where the RF signal is amplified to a certain amplitude level. An address decoder 6 detects the frequency of wobbling (slight serpentine movement of the tracking grooves) of the RF signal. Even when no information is detected, positions in time on the magnetooptical disc 21 are detected.

On the other hand, during recording of data, the data is converted into digital form by an A/D converter 15 and then compressed to about one fifth of its original size by a data compression encoder/decoder 13. The signal is subsequently encoded into an EFM (eight-to-fourteen modulation) signal by an EFM encoder/decoder 9 and sent to a head driver circuit 5 and to a system controller 10.

The head driver circuit 5 drives a magnetic head 2 according to the entered EFM signal to magnetically modulate the magnetic film on the magnetooptical disc 21. The optical pickup 4 directs a light beam at the recording position on the magnetooptical disc 21. The beam heats the position above the Curie point, thus magnetizing this portion in the direction of the magnetic field given by the magnetic head 2. This direction of magnetization is a bit of information recorded.

The optical pickup 4 receives instructions from the system controller 10 to control the focus, tracking, and so forth via a servo controller 8. Also, the pickup 4 causes a carriage 14 to move the magnetooptical disc 21 into a desired radial position.

If alphanumerical keys 18 are operated to select a desired mode of operation or other information, the system controller 10 controls the operation of each component in response to the instructions and displays the mode of operation or the like on a display portion 17.

Figure 8:
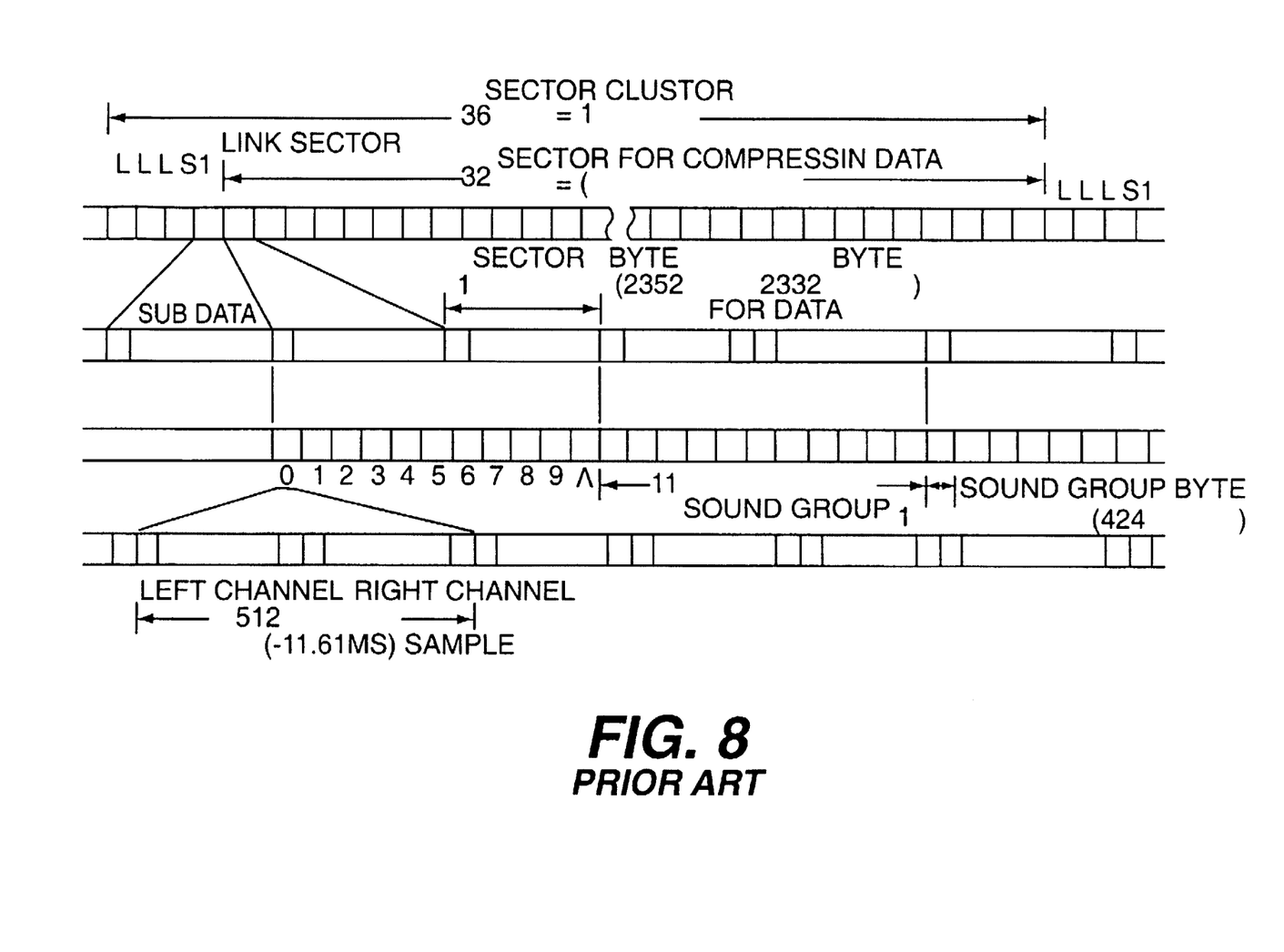
FIG. 8 is a diagram illustrating the data hierarchy of the MD shown in FIG. 7.

The data hierarchy of recorded data created on the MD is next described. FIG. 8 represents the data format of the MD. One cluster is composed of 36 sectors. One sector is 588×4 bytes=2,352 bytes. Compressed audio data is recorded in 32 sectors of these 36 sectors. The remaining sectors are used as link (discarded) sectors and sub-data recording sectors.

Two sectors are divided into 11, which are collectively known as a sound group. One sound group represents information about 512 samples (11.61 ms) of the left and right channels when the information is decoded.

Figure 9:
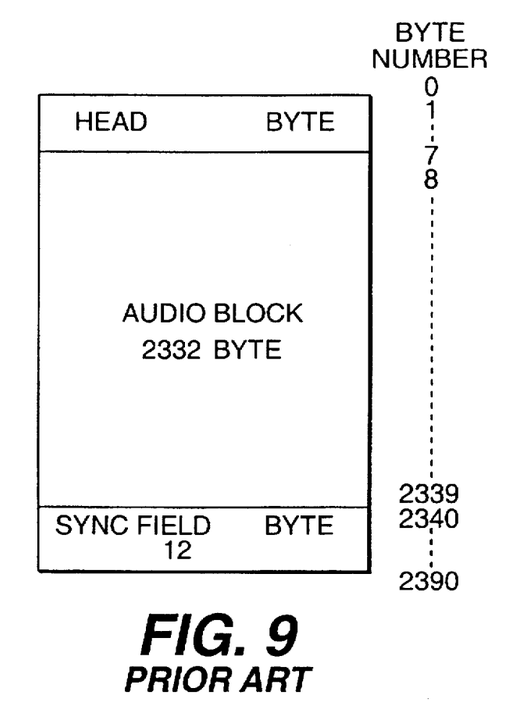
FIG. 9 is a diagram illustrating the data hierarchy of the sectors of the MD shown in FIG. 7.

The contents of one sector (2,352 bytes) are shown in FIG. 9. That is, one sector comprises a header of 8 bytes, an audio block of 2332 bytes, and a sync field of 12 bytes. Cluster/sector information is stored in the header. Compressed audio data is stored in the audio block. Information about synchronization is stored in the sync field. In this data format, the MD player reads data from the disc sector by sector and writes the data into the DRAM 12.

Figure 10:
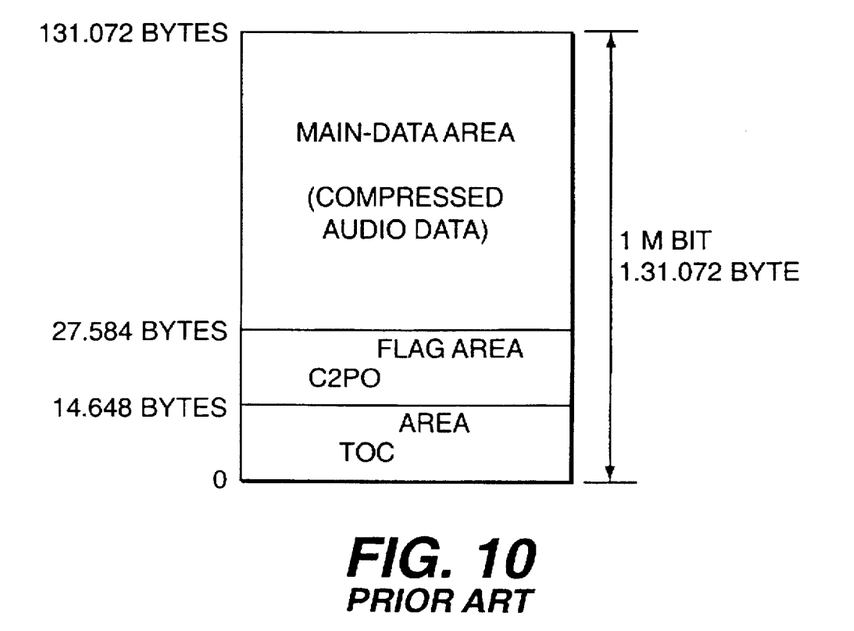
FIG. 10 is a diagram illustrating the data hierarchy within a DRAM incorporated in the MD player shown in FIG. 7.

FIG. 10 shows one example of the allotment of data within DRAM 12. Main data, C2PO flag, and TOC (table of contents) data are separated and stored in their respective areas. Compressed audio data is stored in the main data area. Information about corrections to data is stored in the C2PO flag area. TOC data is stored in the TOC area.

Figure 11:
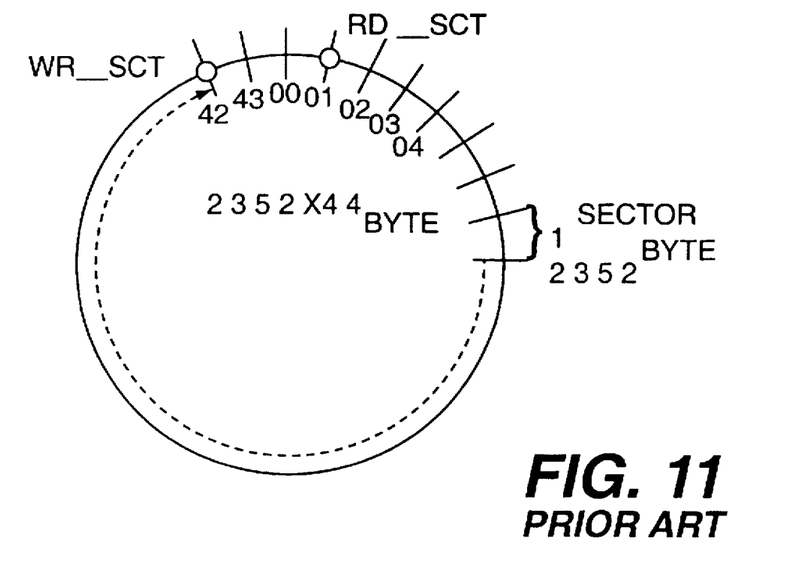
FIG. 11 is a diagram illustrating the structure of a ring buffer (44-nary counter) used to write and read information to and from the DRAM by the MD player shown in FIG. 7.

For example, where the main data area in DRAM 12 has regions capable of accommodating 44 sectors of information, the main data (compressed audio) is written to and read from DRAM 12, using a ring buffer (44-nary counter) as shown in FIG. 11. When writing is started, data items contained in 1 sector are successively stored in DRAM 12 (e.g., data contained in 1 sector are in regions 00–01 shown in FIG. 11). Data contained in each sector are successively stored in regions 01–02, 02–03 up to regions 43–00, whereupon writing into DRAM 12 is inhibited. When reading is started, sectors stored in regions 00–01 are first read. Then, the sectors stored in the regions 01–02 and 02–03 are successively read. When the regions 00–01 become depleted, writing is restarted. In the state shown in FIG. 11, the next writing positions (the positions indicated by a write sector WR SCT that is a write sector number pointer regarding writing into DRAM 12 during playback) are locations 42 and 43. The next read positions (the positions indicated by a read sector $RD_{13}$ SCT that is a sector read sector number pointer regarding reading from the DRAM during playback) are locations 01–02.

The TOC data is also stored in DRAM 12. This TOC data is stored at the header of the recording region of the magnetooptical disc 21 and contains information corresponding to the table of contents (TOC) of a book. Tune numbers, time information, and other kinds of displayed information are all controlled by the TOC data.

The general operation of the MD player constructed as described thus far, (e.g., two discs are played black consecutively). Will now be described by reference to the flowchart of FIG. 12. First, the TOC (table of contents) of one MD 20 held in MD player 100 is read (step 1201). Then, the information is played back from the MD 20 (step 1202). After completion of the playback, the currently played disc is changed to the next MD 20 (step 1203). Then, TOC is read from the next MD 20 (step 1201), followed by playback of the information (step 1202). A decision is made as to whether the disc has been changed (step 1203). If no disc change is made, given ending processing is performed, thus stopping the playback (step 1204).

Figure 12:
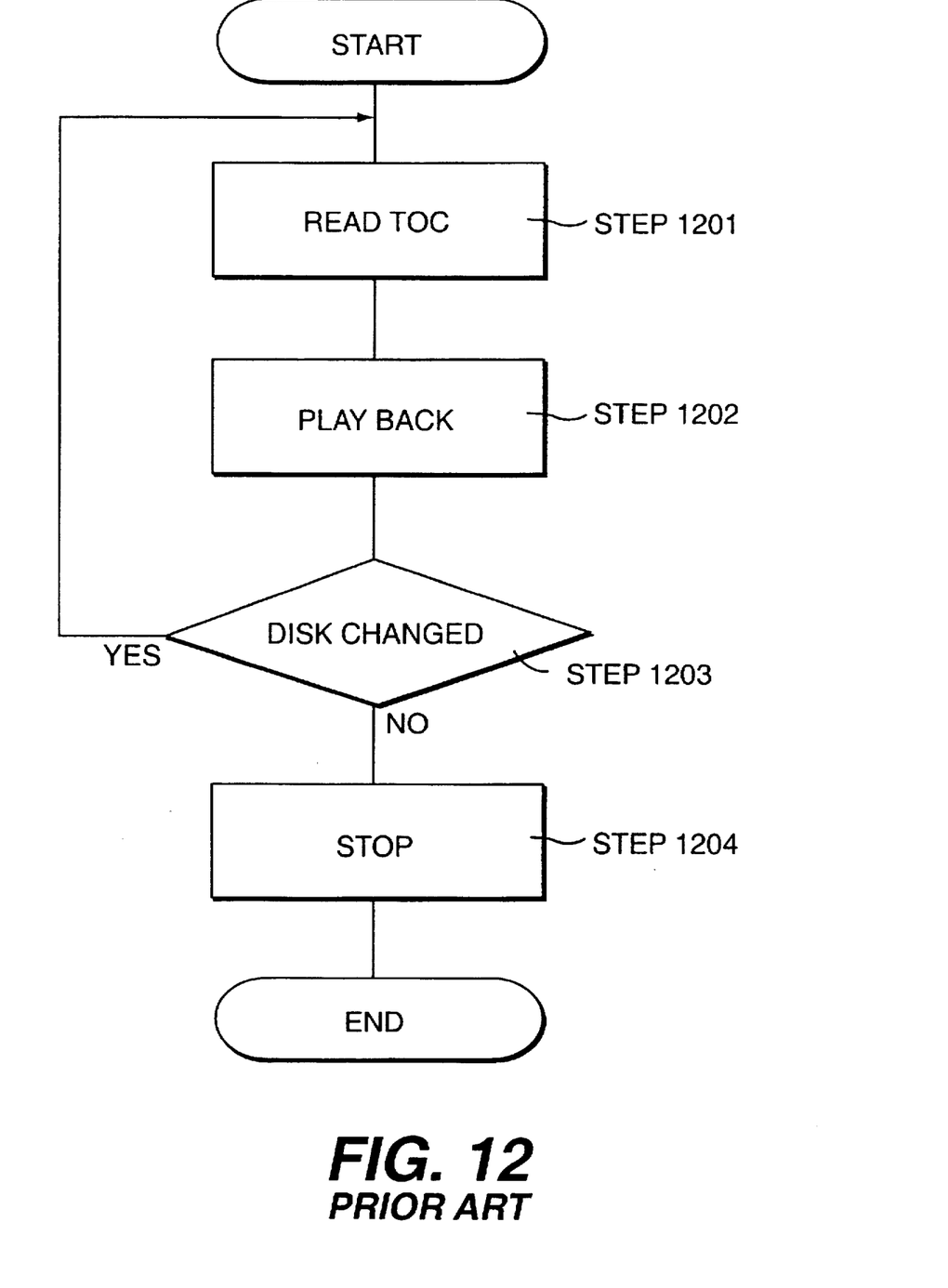
FIG. 12 is a flowchart illustrating the playback operation of the MD player shown in FIG. 7.

In this way, the plural mini discs are exchanged successively and played back consecutively. If the currently played mini disc 20 is changed within the maximum information storage time of DRAM 12 (e.g., where the DRAM has a capacity of 4 Mbits, the time is about 12 seconds), information can be played back from the plural mini discs 20 without cessation.

When the first and second mini discs are played back continuously by the prior art MD player, information contained in the first MD and the information contained in the second MD may be stored together in the DPAM. In this case, it is impossible to judge whether the information read from the DRAM is derived from the first MD or from the second MD. Therefore, it is impossible to judge the origin of the information. Consequently, the MD player cannot inform the user as to whether the presently played disc has been changed. The instant of change may be displayed by detecting the timing at which the disc is changed by the disc changer. In this case, however, a slight time gap exists between the when the data is read from the disc and the instant when the sound actually arrives to the user as mentioned previously. Hence, the display presented to the user is not accurate.

If discs are to be discriminated, using the information read from the DRAM, it is impossible to gain access to the TOC data corresponding to the information read from the DRAM unless plural sets of TOC data are stored in the DRAM. Once again, the displayed data is not accurate.

SUMMARY OF THE INVENTION

In view of the foregoing circumstances, the present invention has been made.

It is an object of the present invention to provide a disc player capable of displaying data with certainty when plural discs are played back consecutively.

The foregoing problems are solved in accordance with the teachings of the invention by a disc player capable of playing back information from plural discs consecutively, the disc player comprising an information storage means for successively storing each unit of information read from each disc, a disc identification flag-adding means for adding a disc identification flag to every unit of information, and a disc identification flag-discriminating means for discriminating every unit of information to which the disc identification flag is added. The disc identification flag-adding means adds the disc identification flag before every unit of information is read from the information storage means.

In this disc player, the disc identification flag-adding means adds a disc identification flag to every unit of information (e.g., sector) read from the disc. The information storage means stores every unit of information to which the disc identification flag is added. The disc identification flag-discriminating means discriminates the disc identification flags added to every unit of information. Accordingly, if information derived from plural discs is stored in the memory, the discs providing the information can be discriminated by referring to the identification flags during decoding.

Another disc player in accordance with the invention is based on the structure described above and further characterized in that the information storage means has a region capable of holding plural sets of TOC (table of contents) information. Plural sets of TOC information derived from plural discs are stored in the storage means. When the presently played disc is changed from a first to a second disc, the TOC information presently used is changed in response to a discriminating output signal from the disc identification flag-discriminating means which makes a decision as to whether the identification flag has changed from the flag identifying the first disc to the flag identifying the second disc.

This structure has the first-mentioned configuration. In addition, the information storage means has a region capable of holding plural sets of TOC information. Therefore, when information about the disc has changed, the currently used TOC information can be switched to the TOC information about the disc supplying this set of information. This eliminates the troubles with the displayed data.

Other objects and features of the invention will appear in the course of the description thereof, which follows.

DETAILED DESCRIPTION OF THE PREFERRED EMBODIMENTS

The preferred embodiments of the present invention are hereinafter described by referring to the accompanying drawings. It is to be noted that like components are indicated by like reference numerals in various figures and that those components which have been already described will not be described below.

Figure 1:
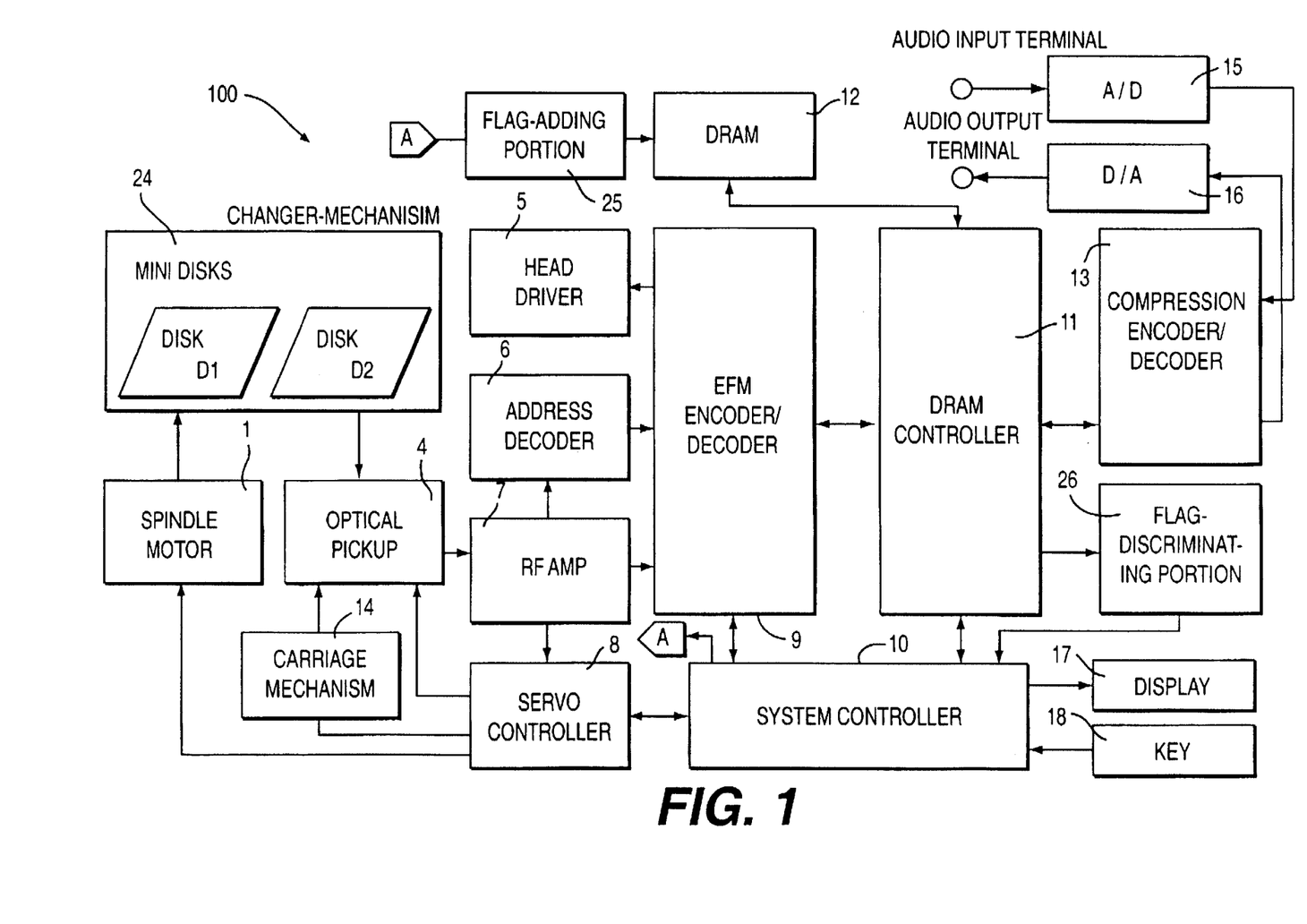
FIG. 1 is a block diagram of an MD player in accordance with the present invention.

Referring to FIG. 1, there is shown a changer-type mini disc (MD) player in accordance with the present invention. This MD player, indicated by reference numeral 24, is similar to the prior art MD player already described in connection with FIGS. 7–12 except that a disc identification flag-adding portion 25 and a disc identification flag-discriminating portion 26 are added.

The disc identification flag-adding portion 25 adds an identification flag to every piece of sector information when the compressed data read from the disc is stored in the DRAM. The disc identification flag-discriminating portion 26 determines from which disc is the information derived that is stored in each sector.

The operation of the present embodiment is described now. For illustration purposes, it is assumed that the MD player can hold two discs. The first and second discs are referred to as discs D1 and D2, respectively. The TOC data areas within the DRAM are referred to as TOC data areas T1 and T2, respectively.

As shown in FIG. 1, if two mini discs, or D1 and D2, are received in the changer-type MD player 24, an optical pickup 4 reads TOC data from the discs D1 and D2. These two sets of TOC data are stored in the TOC data areas T1 and T2, respectively, inside the DRAM 12. Then, if a PLAYBACK instruction is issued, compressed audio data is read from the disc D1 or D2 and stored in the main data area within the DRAM 12. At this time, a system controller 10 sends a PLAYBACK signal to the disc identification flag-adding portion 25, which adds a disc identification flag to each sector of the compressed audio data within the DRAM 12.

The compressed audio data read from the DRAM 12 are sent via a controller 11 to a decoder 13, where the data items are successively decoded (expanded). Thereafter, the data is converted into analog form by a D/A converter 16 and sent out. The compressed audio data read from the DRAM 12 are also sent to the disc identification flag-discriminating portion 26, which sends the result of the decision to the system controller 10. This controller 10 selects correct TOC data according to the result of the decision, and calculates data to be displayed by referring to the selected TOC data. The result is sent to a display portion 17.

Figure 2:
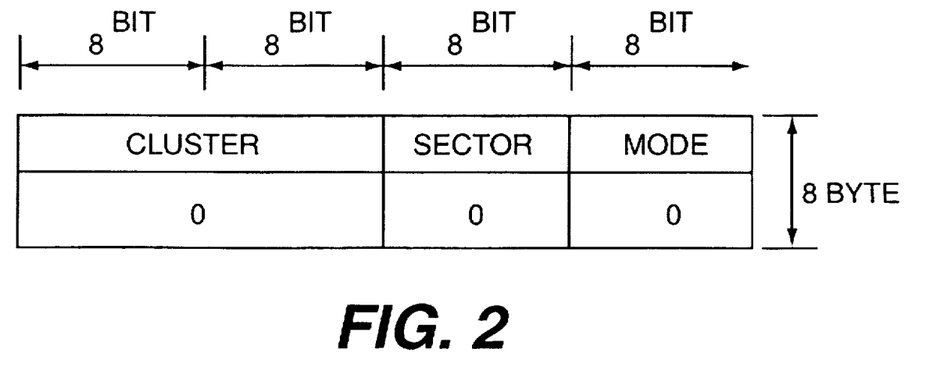
FIG. 2 is a diagram illustrating the structure of the sector header of a mini disc (MD) applicable to the MD player shown in FIG. 1.

This embodiment is next described in further detail. FIG. 2 illustrates the structure of the header of the above-described sector data (FIG. 9). In the MD format, a 16-bit area is allocated to the clusters of the header of the sector data.

Since the maximum recording time of the disc is approximately 74 minutes, the maximum number of clusters is about 2177, which is $881_{(16)}$ when represented in 16-nary notation. A 12-bit data length suffices. That is, the clusters of the header a 4-bit empty area. Therefore, the most significant bit of these unused bits is used as a disc identification flag.

Figure 3:
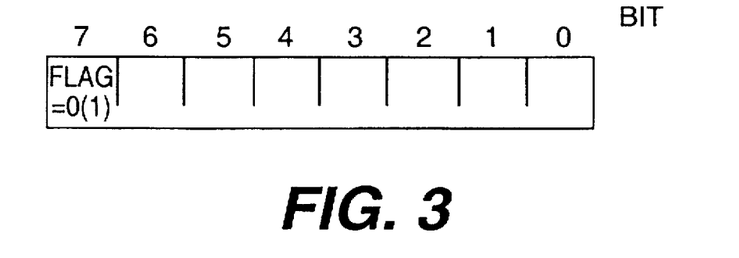
FIG. 3 is a diagram illustrating the structure of disc identification flags in the header of each MD shown in FIG. 1.

FIG. 3 shows one example of the disc identification flag. The most significant bit of the unused bits is employed as a disc identification flag. For example, "0" is added to the data stemming from the disc D1 and "1" is added to the data obtained from the disc D2. One sector of compressed audio data read from any disc is loaded into the DRAM 12 by the DRAM controller 11. When this timing is detected by the system controller 10, the disc identification flag is added to the header.

Figure 4:
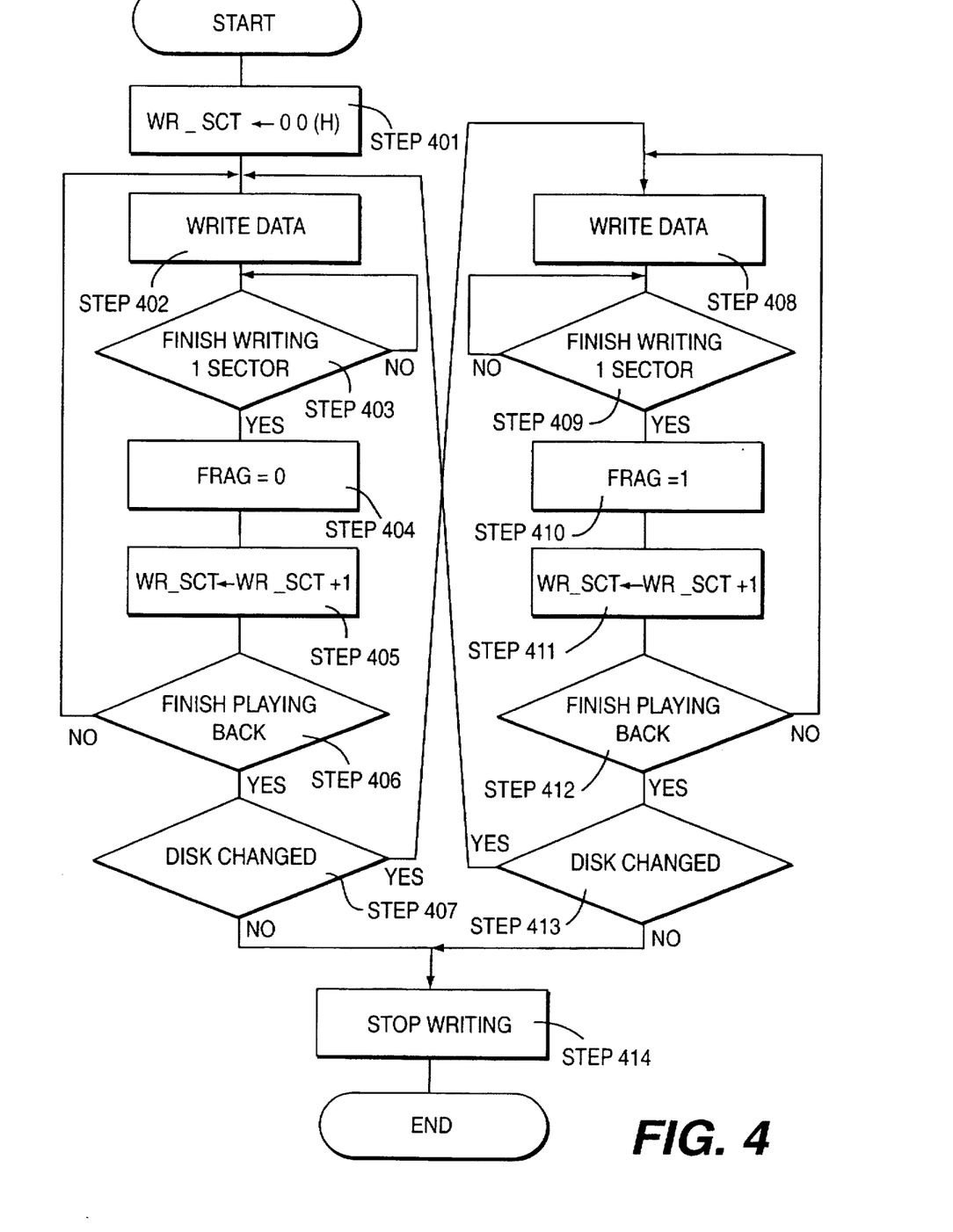
FIG. 4 is a flowchart illustrating a series of operations performed to write MD data into the DRAM of the MD player shown in FIG. 1.
Figure 5:
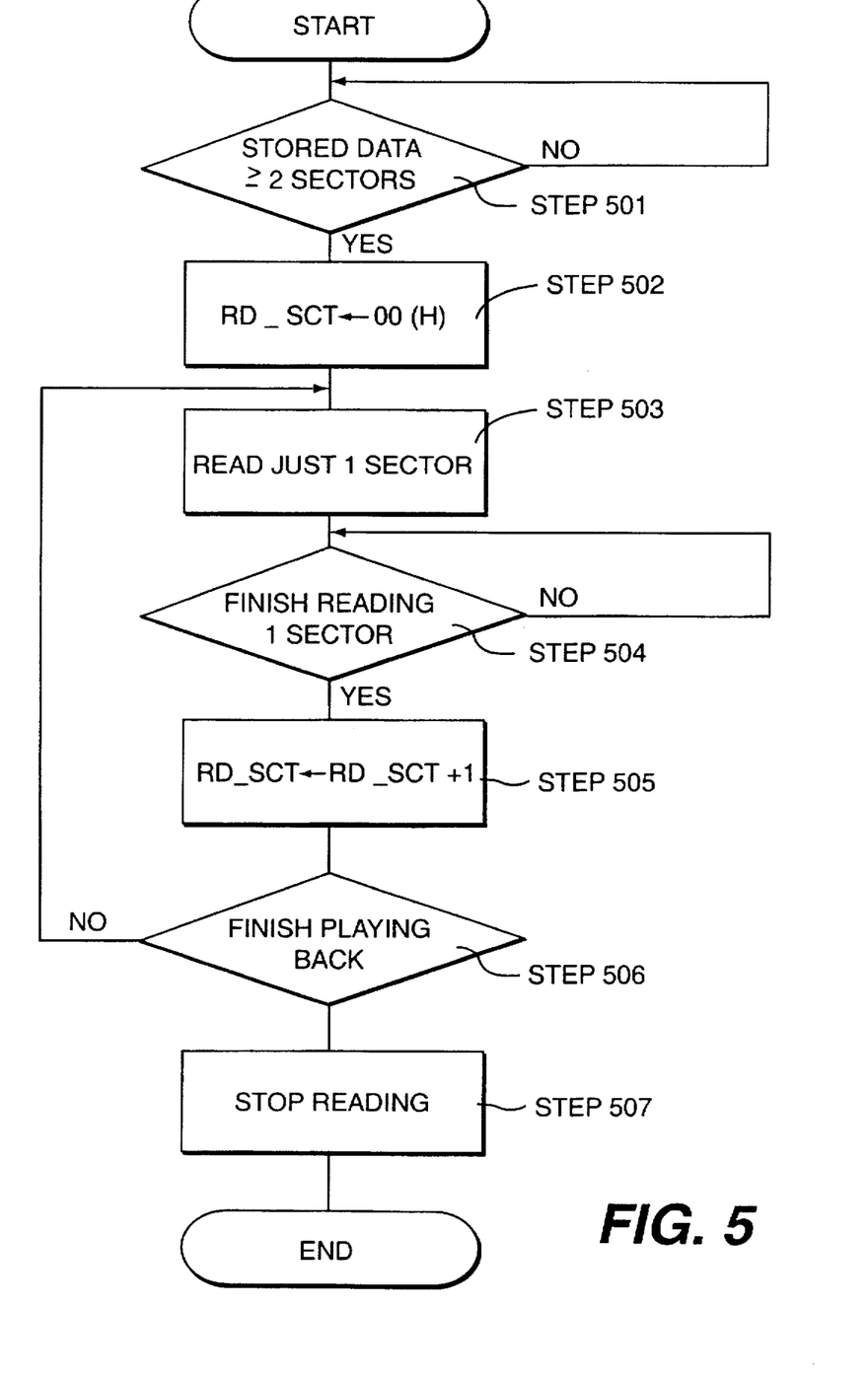
FIG. 5 is a flowchart illustrating a series of operations performed to read MD data from the DRAM of the MD player shown in FIG. 1, the MD data being recorded on one of MDs.

The operation of the changer-type MD player 24 of this construction to write and read data to and from the DRAM 12 is next described by referring to FIGS. 11, 1, 4, and 5. FIG. 11 depicts the structure of the ring buffer. FIG. 1 shows the structure of the MD player. FIGS. 4 and 5 are flowcharts illustrating the operation of the player. In the present embodiment, it is assumed that the disc D1 is first played. Immediately thereafter, the disc D2 is played. Thus, the playback is completed.

FIG. 4 is a flowchart illustrating a series of operations performed to write data into the DRAM 12. First, the ring buffer (44-nary counter) which writes at a position WR_SCT, as shown in FIG. 11, is prepared.

First, the position WR_SCT is brought to address 00 (step 401). According to a PLAYBACK START instruction, compressed audio data read from the disc D1 is written into the DRAM 12 (step 402). As a result, one sector of compressed audio data is loaded into regions at addresses 00–01 (FIG. 11) indicated by the position WR_SCT. Then, the DRAM controller 11 makes a decision as to whether one sector of data has been loaded in the DRAM. The DRAM controller keeps monitoring until the writing is complete. On completion of this writing, the DRAM controller 11 supplies a signal indicating the writing of one sector to the system controller 10 (step 403). Subsequently, a disc identification flag "0" is added to the headers of the sectors lying at positions within the DRAM 12 indicated by the WR_SCT (in this example, they are loaded at addresses 00–01) (step 404). As a result of these processing steps, writing of one sector to the DRAM 12 is complete, and the ring buffer WR_SCT is incremented by (step 405). The ring buffer WR_SCT is brought to next addresses 01–02. If the playback of the disc D1 is not complete, control goes to step 402, where this series of operations are repeated, until all the information on the disc D1 is loaded into the DRAM 12. When the reading of information from the disc D1 is complete, the system controller 10 makes a decision as to whether the disc has been changed (step 407). If the disc has not been changed, control proceeds to step 414, where writing of data to the DRAM is inhibited.

In the present embodiment, the discs D1 and D2 are played back consecutively and so control goes to step 408, where information on the disc D2 is loaded into the DRAM 12 sector by sector, in the same way as in the case of the disc D1. Then, the DRAM controller 11 makes a decision as to whether one sector of data has been loaded in the DRAM and keeps monitoring until the writing is complete. Then, the DRAM controller 11 produces a signal indicating writing of one sector to the system controller 10 (step 409). Thereafter, a disc identification flag "1" is added to the position within the DRAM 12 indicated by WR_SCT (step 410). Thus far the writing of one sector to the DRAM 12 has been completed, and the ring buffer WR_SCT is incremented by 1 (step 411). If the playback of the disc D2 is not complete, control goes to step 408, where this series of operations are repeated, until all the information on the disc D2 is loaded in the DRAM 12. Then, the system controller 10 makes a decision as to whether the disc-changing operation is complete (step 413). If the disc has been changed, control goes from step 413 to step 402, and the disc D1 is again played back. In the present embodiment, this series of playback operations is ended after the playback of the disc D2 is complete. Control proceeds to step 414, where writing of the data is inhibited.

The manner in which data is read from the DRAM 12 is next described. FIG. 5 is a flowchart illustrating this operation for reading data from the DRAM 12. First, sector data are transferred from the DRAM 12 to the decoder 13, using a ring buffer $RD_{13}SCT$ (44-binary counter) shown in FIG. 11, similar to the case in which writing is done.

When reading from the DRAM 12 is started, a decision is made as to whether 2 or more sectors of compressed audio data are loaded in the DRAM 12 (step 501). If not (NO), this step 501 is repeated. If loaded (YES), the ring buffer RD__SCT is set at 00 (H) (step 502). One sector of compressed audio data is transferred to the decoder 13 (step 503). Thus far the reading of one sector from the DRAM 12 has been completed (step 504). The ring buffer RD__SCT is incremented by 1 (step 505). Control goes again to step 503, and the same sequence of operations are repeated. If all the data in the DRAM is read out or a PLAYBACK END instruction is given (step 506), the reading of the data from the DRAM is stopped (step 507).

Figure 6:
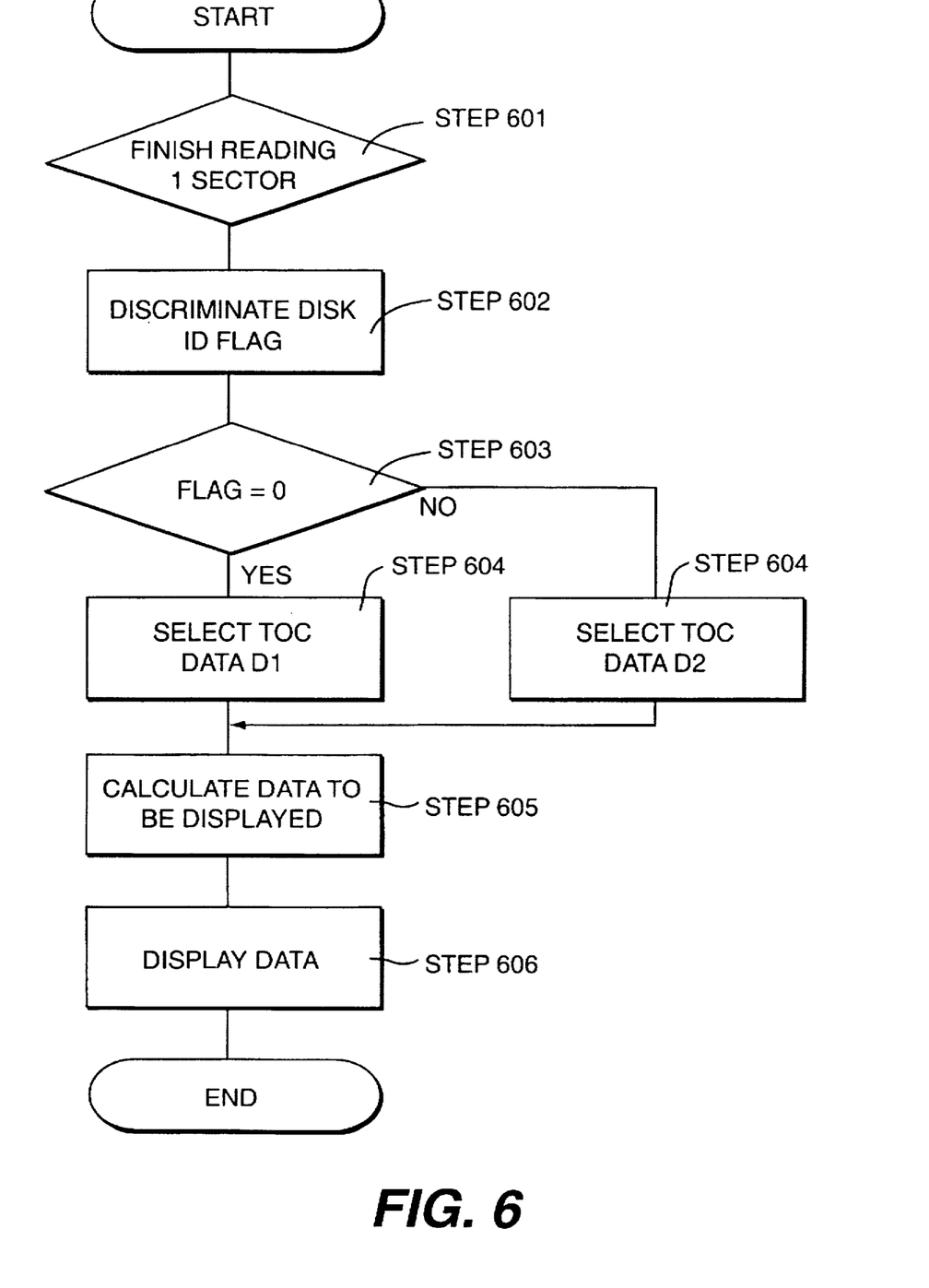
FIG. 6 is a flowchart illustrating a series of operations performed to generate data displayed on the MD player shown in FIG. 1.

The manner in which data to be displayed is generated is next described by referring to the block diagram of FIG. 1 and to the flowchart of FIG. 6. One sector of compressed audio data from the DRAM 12 is transmitted to the disc identification flag-discriminating portion 26, which reads the kind of disc identification flag added to the header. A decision is made as to whether the reading of one sector is complete (step 601). Disc identification flags are then discriminated (step 602) and the result is sent to the system controller 10. For example, if a disc identification flag "0" is added (step 603), the system controller 10 judges that the information is derived from the disc D1 (step 604). TOC data on the disc D1 is selected. In the present embodiment, the TOC data on the disc D1 is loaded into the TOC data area T1 and so this data area T1 is selected. The system controller 10 calculates data to be displayed, by referring to the selected TOC data (step 605). The system controller 10 generates various kinds of data such as tune numbers and time data and sends them to the display portion 17 (step 606). When the played disc is changed, data on the discs D1 and D2 have been stored in the DRAM 12. Therefore, the above-described processing is carried out while the data on the disc D1 is being decoded by the decoder 13. If during the reading of the information from DRAM 12, the disc identification flag-discriminating portion 26 (step 602) determines that the information is no longer derived from disc D1, i.e. the result of (step 603) is NO and the flag indicator is "0", the system controller 10 selects the TOC data of disc D2 (step 604). In the present embodiment, since the TOC data on the disc D2 is loaded in the TOC data area T2, it is selected. The data to be displayed is calculated by referring to the selected TOC data (step 605). Various kinds of data to be displayed, such as tune numbers and time data, are generated and displayed on the display portion (step 606).

In this manner, in the present embodiment, when information is played back from plural mini discs consecutively, TOC data are read from two or more mini discs 20. Then, the data is played back in succession. When compressed audio data is loaded into the DRAM, disc identification flags are added to the individual MDs 20.

Consequently, it is possible to know from which one of the discs is the compressed audio data read from the DRAM 12 derived. That is, the plural discs can be discriminated. Access to the correct TOC data is implemented according to the result of this discrimination. As a result, data to be displayed such as tune numbers and time data present no problems.

In the present embodiment, the MD player holds two discs. The present invention is not limited to this. For example, the invention can also be applied to an MD player accommodating more than two discs.

Where the player is equipped with a dedicated DRAM for adding disc identification flags, the DRAM may have a disc identification flag-adding portion. It is not necessary that the TOC data and main data be loaded in the same DRAM. Another memory for storing only the TOC data may be provided. The TOC data area within the DRAM may be designed to store TOC data derived from more than two discs.

In this case, if it is necessary to write plural sets of TOC data into the DRAM, disc identification flags as many as the sets of TOC data are necessary. For example, where all sets of TOC data derived from four discs are stored in the DRAM, 2-bit disc identification flags such as "00", "01", "10", and "11" may be prepared.

In the present embodiment, a disc identification flag is added to the most significant bit of the header. The flag may be added to any region within the header as long as it is not used. Also in the present embodiment, the disc identification flag is added after sector data are written into the DRAM. Rather, the flag may be added anytime as long as the sector data to which the disc identification flag has been added is not yet read from the DRAM.

As thus far described, in the disc player in accordance with the present invention, TOC data are read from at least two discs during playback of information. Then, the discs are played back in succession. When compressed audio data are loaded into a DRAM, a disc identification flag is added to each disc. Accordingly, if information derived from plural discs is stored in the memory, the discs can be discriminated by referring to the disc identification flags during decoding, because the disc identification flags are added to the discs. Access to correct TOC data can be implemented according to the result of the discrimination. Then, tune numbers, time data, and other kinds of data can be generated. Therefore, when the currently played disc is changed, no problems are introduced to the displayed data. This assures that plural discs are played back consecutively.

It will be apparent to those skilled in the art that various modifications and variations can be made to the disc player of the present invention without departing from the spirit or scope of the invention. Thus, it is intended that the present invention cover the modifications and variations of this invention provided they come within the scope and spirit of the appended claims and their equivalents.

What is claimed is:

1. A disc player capable of playing back information from a plurality of discs consecutively, the disc player comprising:

information storage means for storing units of multimedia data read from the plurality of discs unit by unit;

disc identification flag-adding means for adding a disc identification flag to each unit of multimedia data when each unit of multimedia data is written to the information storage means; and disc identification flag-discriminating means for discriminating between the units of multimedia data by using the disc identification flag.

2. The disc player of claim 1, wherein (A) the information storage means has an area capable of holding plural sets of table of contents (TOC) information, (B) each set of TOC information derived from each of the plurality of discs is stored in said information storage means, and (C) when a disc currently being played is changed from a first disc to a second disc, a set of TOC information being currently used is change according to a discriminating output signal from the disc identification flag-discriminating means from the set of TOC information of the first disc to the set of TOC information of the second disc.

3. The disc player of claim 2, further comprising means for displaying data based upon the set of TOC information currently being used by the disc player.

4. A disc player capable of playing back information from a plurality of discs consecutively, the disc player comprising:

an information storage portion for storing units of multimedia data read from the plurality of discs unit by unit;

a disc identification flag-adding portion for adding a disc identification flag to each unit of multimedia data when each unit of multimedia data is written to the information storage portion; and a disc identification flag-discriminating portion for discriminating between the units of multimedia data by using the disc identification flag.

5. The disc player of claim 4, wherein the information storage portion has an area capable of holding plural sets of table of contents (TOC) information, each set of TOC information derived from each of the plurality of discs is stored in the information storage portion, and when a disc currently being played is changed from a first disc to a second disc, a set of TOC information being currently used is changed according to a discriminating output signal from the disc identification flag-discriminating portion from the set of TOC information of the first disc to the set of TOC information of the second disc.

6. The disc player of claim 5, further comprising a portion for displaying data based upon the set of TOC information currently being used by the disc player.

* * * * *

UNITED STATES PATENT AND TRADEMARK OFFICE
CERTIFICATE OF CORRECTION

PATENT NO. : 5,896,352
DATED : April 20, 1999
INVENTOR(S) : Yoshihiko TAKENAKA et al.

It is certified that error appears in the above-identified patent and that said Letters Patent is hereby corrected as shown below:

Column 9, Line 16 change "change" to --changed--.

Signed and Sealed this

Twenty-eighth Day of November, 2000

Attest:

Q. TODD DICKINSON

*Attesting Officer*        *Director of Patents and Trademarks*